Aug. 27, 1940.  J. H. GUYER  2,212,774
PULLEY
Filed Dec. 22, 1939  2 Sheets-Sheet 1
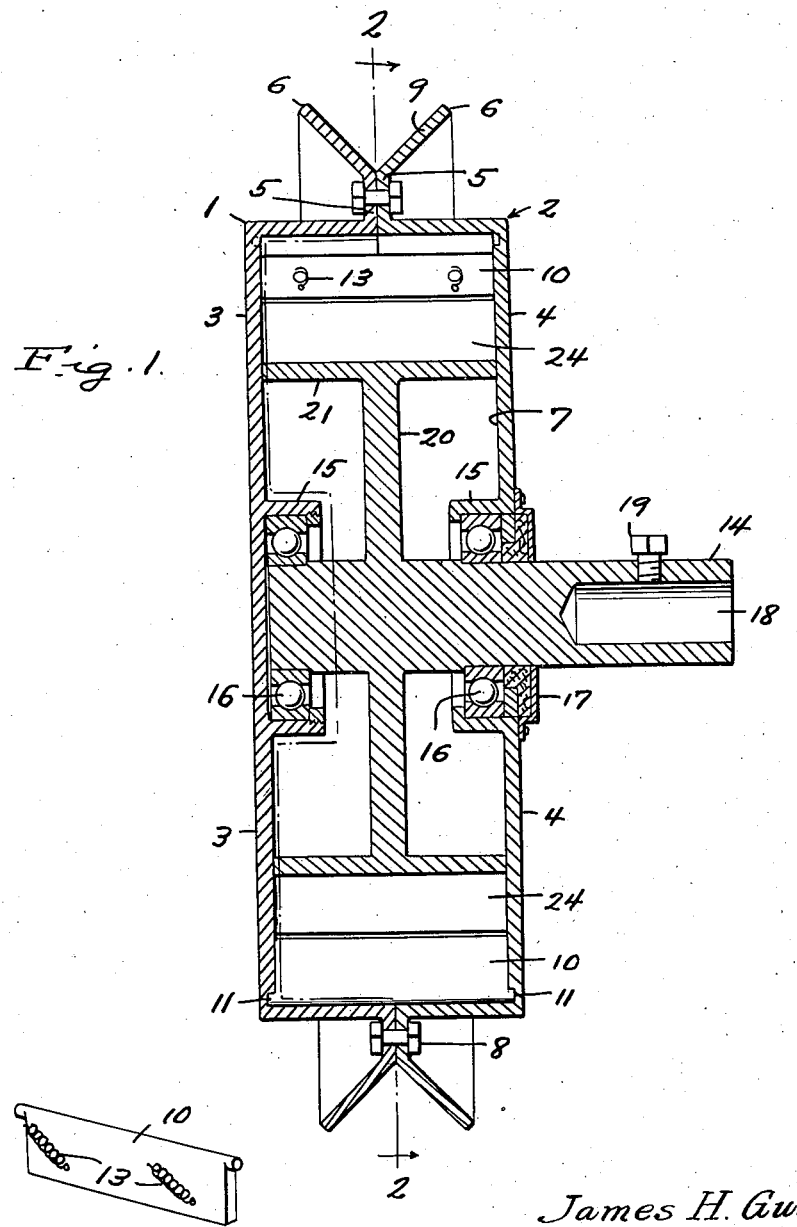
Inventor
James H. Guyer
By Clarence A. O'Brien
and Hyman Berman
Attorneys

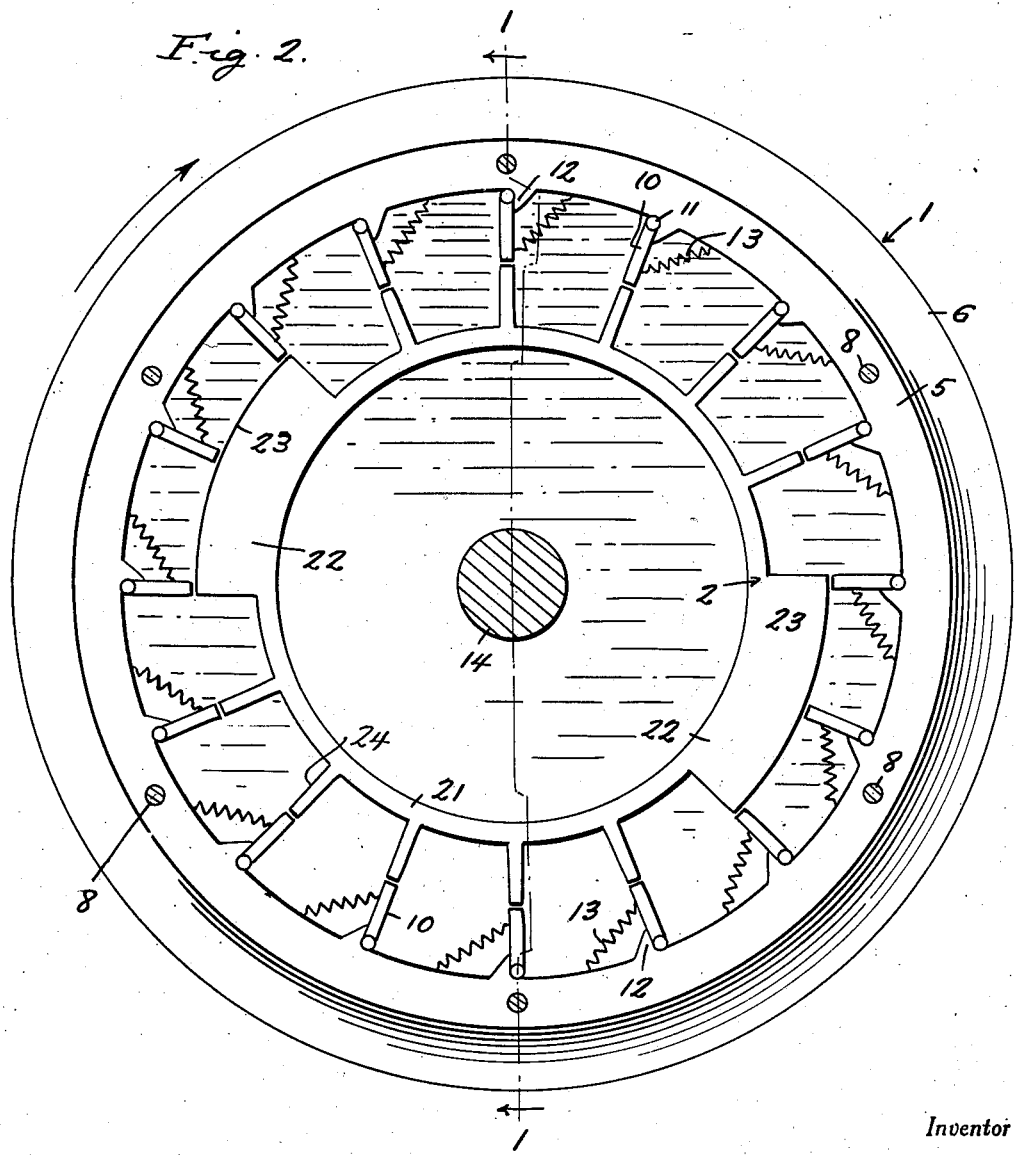

Patented Aug. 27, 1940

2,212,774

UNITED STATES PATENT OFFICE 2,212,774

PULLEY

James H. Guyer, Porterville, Calif.

Application December 22, 1939, Serial No. 310,645

2 Claims. (Cl. 192—58)

My invention relates to improvements in pulleys for use more particularly as automobile engine equipment, for instance, in driving the fan, generator, or water pump.

As is well-known, such adjunctive mechanisms of an automobile power plant are designed to function at maximum efficiency at a predetermined speed and higher speed operation thereof does not increase their efficiency but merely results in wear and reduces horse-power of the engine.

The principal object of my invention is to provide a simply constructed efficient pulley adapted under high speed operation of an engine to drive such adjunctive parts of an automobile power plant as those above indicated at a lower speed, thereby prolonging the life of such parts and providing for obtaining more power from the engine.

Another object is to provide a device of the character and for the purpose above set forth embodying a fluid clutch reducing friction to a minimum.

To the accomplishment of the above, and subordinate objects presently appearing, a preferred embodiment of my invention has been illustrated in the accompanying drawings, set forth in detail in the succeeding description and defined in the claims appended hereto.

In said drawings:

Figure 1 is a view in transverse section taken on the line 1—1 of Figure 2 looking in the direction indicated by the arrows and illustrating the preferred embodiment of my invention, Figure 2 is a view in section taken on the line 2—2 of Figure 1 looking in the direction indicated by the arrows, and Figure 3 is a view in perspective of one of the paddles.

Referring to the drawings by numerals, the illustrated embodiment of my improved pulley comprises an outer unit 1 and an inner unit 2, relatively rotatable.

The outer unit 1 comprises a pair of dished circular sections 3, 4, each having a radial external edge web 5 extending around the same and merging into an oblique flange 6. The sections 3, 4, are secured together in concentric relation open sides opposite so as to form a circular oil containing chamber 7 therein. The securing means comprises bolts 8 extending through the webs 5 in such relation of the sections, said webs and flanges 6 in such relation of the sections forming a belt groove 9 around the unit 1. A plurality of normally radial blade-like paddles 10 are hinged, as at 11, to the circumferential walls of the chamber 7 at equi-distantly spaced points around the same and to extend uniformly into the chamber 7, said paddles being of elongated rectangular form and extending lengthwise across the chamber 7 with a slight clearance between the ends thereof and the side walls of the chamber. As will be clear from an inspection of Figure 2, the axes of the hinges 11 are parallel with the axis of rotation of the unit 10 1 whereby the paddles 10 are swingable into and from radial position. The sections 3, 4, are provided with transverse ribs 12 mating in pairs end to end and forming circumferentially spaced stops in the chamber 7 adjacent the hinges 11 on one side of the paddles 10 blocking swinging of the latter in one direction from radial position. A pair of coil springs 13 suitably connected to each paddle 10 and to the inner circumferential wall of the chamber 7, at opposite ends of the paddle, respectively, yieldingly retain the paddles 10 in radial positions against said ribs 12 and tension the same against swinging away from the said ribs into positions tangential to the inner circumferential wall of the chamber 7.

The inner unit 2 comprises a shaft 14 extending axially into the chamber 7 and journalled within the chamber in a pair of bearings 15 provided on the side walls of the chamber 7, respectively, said bearings including anti-friction assemblies 16. The shaft 14 extends out of one unit 4 through a suitable stuffing box 17 and the extending end thereof is socketed, as at 18, and provided with a set screw 19 for attachment to a shaft, not shown. The shaft 14 has a radial web 20 in the plane of the unit 1 carrying an annular rim 21 concentric to the axis of the shaft and spaced from the inner ends of the paddles 10, said rim extending across the chamber 7 with a slight clearance for rotation therein. A pair of diametrically opposite peripheral bosses 22 are provided on the rim 21 having outer faces 23 concentric to the rim and of a length to span at least three of the paddles 10, respectively. Intermediate the bosses 22 radial paddles 24, similar to paddles 10, are provided on the rim 21 to extend radially therefrom, said paddles 24 being integral with said rim and spaced apart equidistantly from each other and from the bosses 22.

Referring now to the operation, when the pulley is used to drive an adjunctive mechanism of the automobile power plant, the shaft 14 of the inner unit 2 is fixed to the operating shaft of the mechanism to be driven, by means of the socket 18 and set screw 19 and the outer unit 1 is suitably connected by a belt, not shown, to the engine to be driven thereby. The outer unit 1 is designed to be driven, as indicated by the arrow in Figure 2, in a direction such that the ribs or stops 12 are leading and the paddles 10 trail said ribs. The chamber 7 is filled with oil. The revolution of the paddles 10 being opposed by resistance of the oil, substantially pocketed between said paddles 10 and the bosses 22 and paddles 24, a torque drive is imparted to the unit 2 by the unit 1. As the speed of operation of the units increases, the resistance set up by the oil increases in proportion to the increase in load on shaft 14 occasioned by higher speed operation thereof.

At this point, it should be explained, that the normal clearance between the paddles 10 and the abutments 22 and paddles 24 is just sufficient to permit the paddles 10 to pass abutments 22 and paddles 24 so that leakage of oil through said clearance is negligible normally. Also the springs 13 are constructed and arranged so that as the increasing resistance set up by the oil results in a predetermined degree of back pressure against paddles 10, said springs will yield permitting paddles 10 to swing rearwardly, as regards the direction of rotation, and into tangential positions thereby permitting oil to pass freely between said paddles 10 and abutments 22 and paddles 24 so that the torque effect between the two units is decreased with the result that the unit 1 is permitted to over-run the unit 2, and unit 2 is slowed down relative to unit 1. It should also be explained that springs 13 are arranged so as to overcome centrifugal forces tending to move the paddles 10 rearwardly, and so as to permit the unit 1 to overcome the inertia of unit 2 initially.

The abutments 22, at high-speed operation of unit 1, prevent the oil from racing freely between the paddles 10, 24.

Obviously the inner unit 2 may be used to drive the outer unit by suitably attaching the same to the crank shaft of the engine. In this use of the pulley, the unit 2 is rotated in the opposite direction to that previously described to similarly rotate the unit 1, the operation being the same except that the paddles 24 and abutments 22 become the impelling means and the unit 1 is permitted to slow down instead of unit 2.

The foregoing will, it is believed, suffice to impart a clear understanding of my invention without further explanation.

Manifestly the invention, as described, is susceptible of modification without departing from the inventive concept and right is herein reserved to such modifications as fall within the scope of the subjoined claims.

What I claim is:

1. In a device of the class described, a drumlike outer section forming a circular oil containing chamber, circumferential exterior flanges on said unit providing a belt guide thereon, an axial shaft rotatably mounted in said unit and extending out of one side thereof, an annular concentric rim fast on said shaft within said chamber, a plurality of paddles in said chamber extending transversely thereof and hinged to the inner circumferential wall thereof in circumferentially spaced relation for swinging movement thereon into and from substantially radial positions, means yieldingly retaining said paddles in radial position for swinging movement therefrom in one direction, and a plurality of transverse paddles on said rim extending radially outwardly therefrom in circumferentially spaced relation and adapted to clear the inner ends of said first mentioned paddles in close proximity to said ends in the radial position of said first mentioned paddles.

2. In a device of the class described, a drumlike outer section forming a circular oil containing chamber, circumferential exterior flanges on said unit providing a belt guide thereon, an axial shaft rotatably mounted in said unit and extending out of one side thereof, an annular concentric rim fast on said shaft within said chamber, a plurality of paddles in said chamber extending transversely thereof and hinged to the inner circumferential wall thereof in circumferentially spaced relation for swinging movement thereon into and from substantially radial positions, means yieldingly retaining said paddles in radial position for swinging movement therefrom in one direction, and a plurality of transverse paddles on said rim extending radially outwardly therefrom in circumferentially spaced relation and adapted to clear the inner ends of said first mentioned paddles in close proximity to said ends in the radial position of said first mentioned paddles, said means including stops on the circumferential wall of said chamber establishing the radial position of said first mentioned paddles.

JAMES H. GUYER.